Patented July 19, 1927.

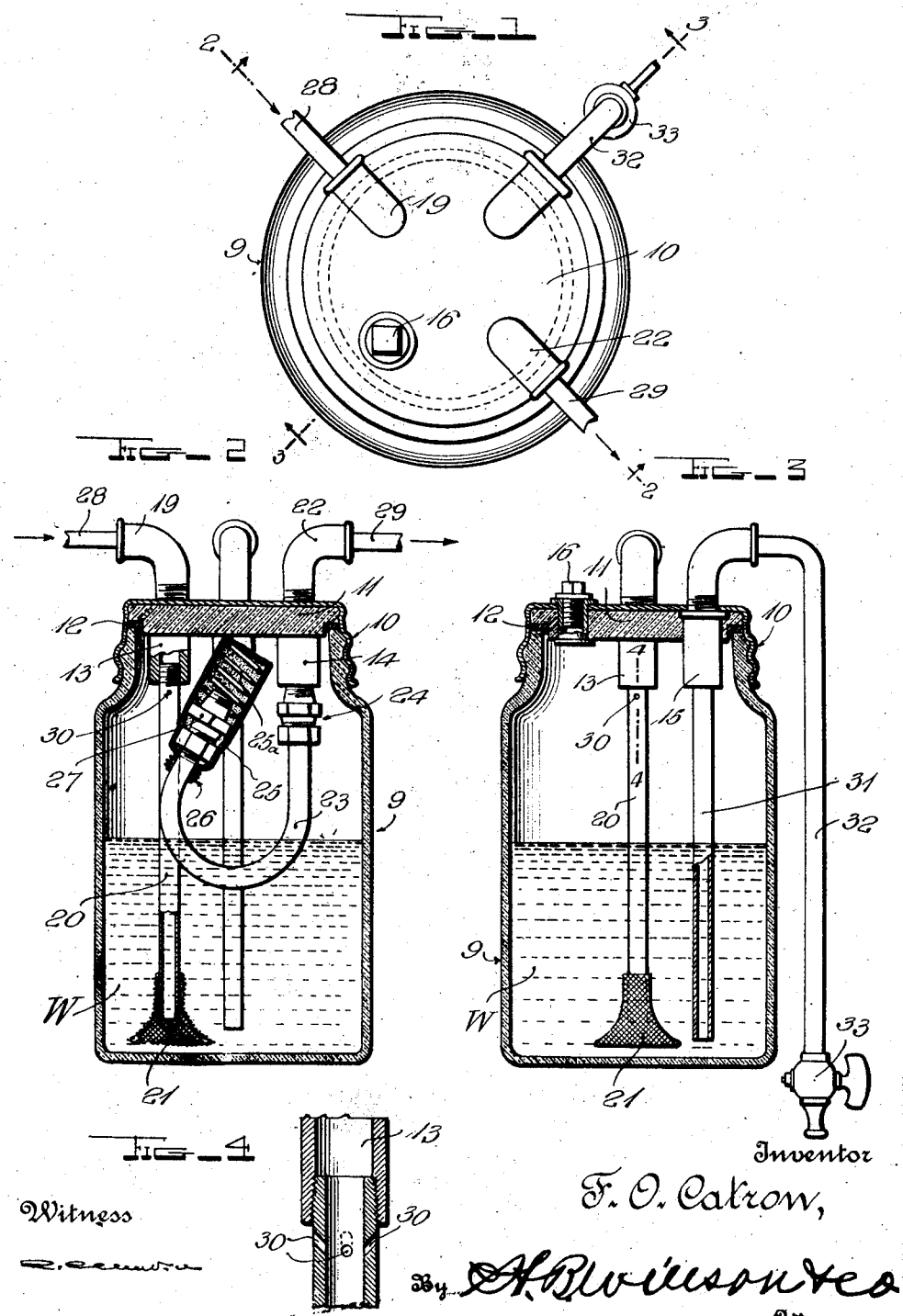

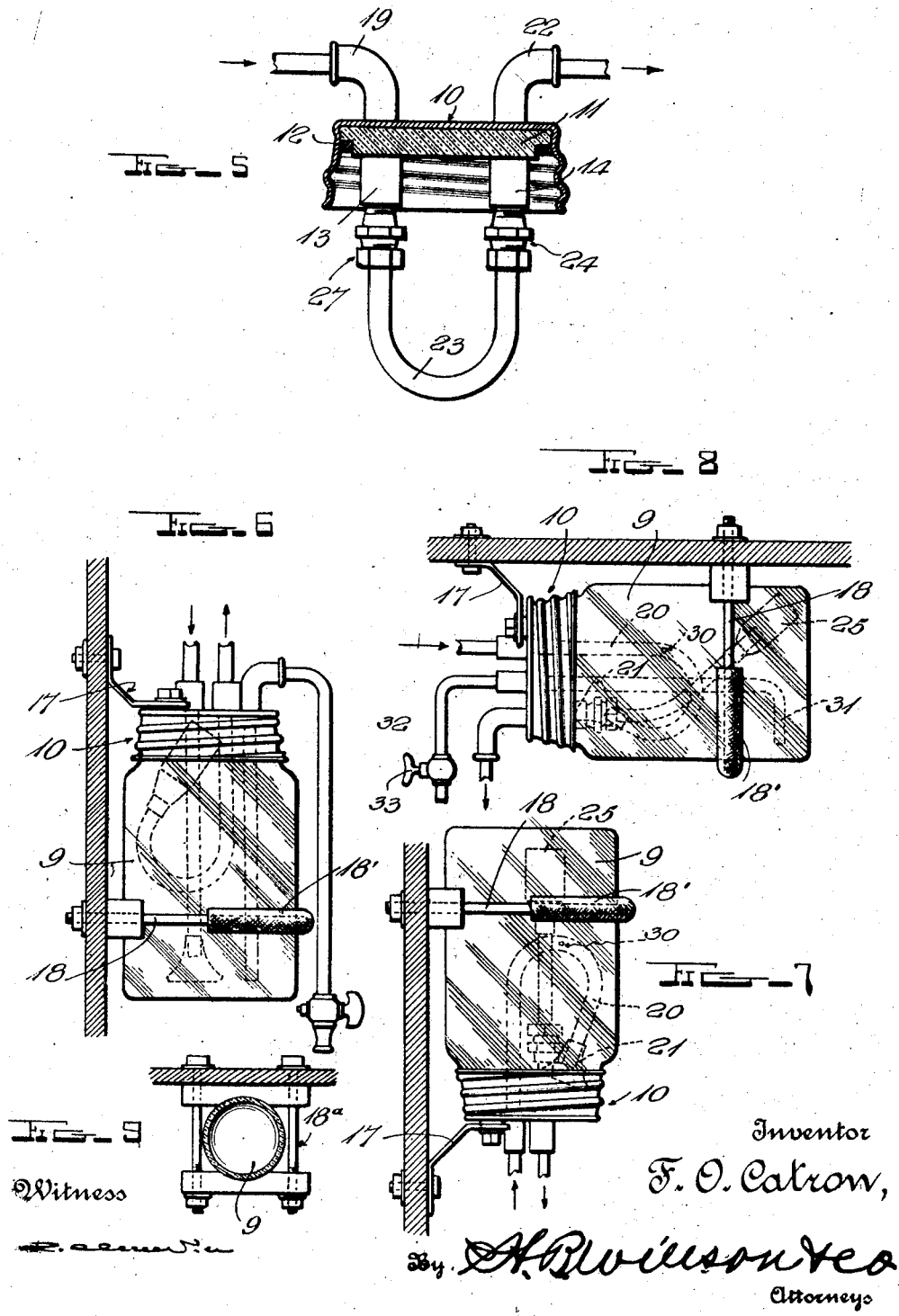

1,636,285

UNITED STATES PATENT OFFICE.

FREDERICK O. CATRON, OF MEMPHIS, TENNESSEE, ASSIGNOR OF ONE-HALF TO NETTIE P. CATRON, OF MEMPHIS, TENNESSEE.

LIQUID FILTER.

Application filed January 11, 1926, Serial No. 80,574. Renewed January 10, 1927.

The invention relates to new and useful improvements in filters and while the device is intended primarily for filtering gasoline or other fuel for internal combustion engines, it can be successfully used for filtering other liquids, for instance lubricating oil for the motor or engine.

The filter is of a type embodying a glass jar so that all foreign matter collecting in it can be readily seen and removed from time to time, and one object of the invention is to provide unique means whereby the liquid inlet and the liquid outlet may be directly connected with each other so as to conduct fuel from one to the other, in case of breakage or other injury to the jar. Thus, in case of such injury and the absence of a new jar to be substituted, the filter may be thrown out of action and the liquid permitted to flow, for instance from the gas tank of a machine to the carbureter thereof.

Water is used in the lower portion of the jar as a filtering medium, and the liquid inlet passage includes a tube within the jar extending to a point below the water level, so that the liquid to be filtered, in order to reach the filtered liquid outlet at the upper portion of the jar, must pass through the water and deposit all foreign substances in the latter. A further object of the invention is to provide the above named tube with at least one opening above the water level and preferably with a plurality of such openings, the latter serving to prevent any possible back flow of sediment and the like from the lower portion of the jar, through the liquid inlet passage and back to the supply tank, said opening or openings also serving to permit the discharge of liquid from the tube into the container, in case the water in the lower portion of the latter should become frozen.

With the foregoing in view, the invention resides in the novel subject matter hereinafter described and claimed, the description being supplemented by the accompanying drawing.

Figure 1 is an end elevation of a filter constructed in accordance with my invention.

Figs. 2 and 3 are sectional views on lines 2—2 and 3—3 of Fig. 1;

Fig. 4 is a detailed section as indicated by line 4—4 of Fig. 3.

Fig. 5 is a sectional view partly in elevation, illustrating the manner of connecting the inlet and outlet passages when the jar is broken and must be discarded.

Figs. 6, 7 and 8 are side elevations showing different positions in which the filter may be used.

Fig. 9 is a detail sectional view, partly in elevation showing a different form of clamp which may be used to assist in supporting the filter.

For the sake of clarity, the device will be described in the position disclosed in Figs. 1 to 6. The numeral 9 designates an ordinary glass jar having a metallic cap 10, the two having the usual threaded connection. Within the upper portion of this cap is a disc 11 of suitable material, and a gasket 12 is interposed between said disc and the upper end of the jar 9. This disc 11, in the present disclosure, is formed with three downwardly projecting tubular bosses 13, 14 and 15 which may be connected therewith in any desired manner. The cap and disc are also by preference provided with an opening which is normally closed by a screw plug 16. If, from time to time, it is necessary to replenish the water W in the lower portion of the jar 9, this may be done by removing the plug 16 and pouring the water through the opening. This plug may also be instrumental in connecting the device with a bracket 17 to assist in supporting it, any desired yoke or the like 18 or 18ª being passed around the jar 9 to assist in rigidly supporting the device. Yoke 18 may be padded, with a tube 18'.

An inlet for the liquid to be filtered, is shown, said inlet preferably including an elbow 19 threaded into the outer end of the boss 13, and a tube 20 threaded into the inner end of said boss, said tube extending to a point below the level of the water W and having an appropriate strainer 21. The outlet means for the filtered liquid, in the present showing, includes an elbow 22 communicating with the outer end of the boss 14, and a bendable tube 23 within the container 9, this tube being coupled at one end to the inner end of the boss 14, as indicated at 24, while the other end of said tube 23 carries a strainer 25 which is preferably in the form of a chamois sack held distended by a coiled spring 25ª, the sack being detachably held upon the tube 23, by a wire wrapping or the like 26.

Normally confined within the strainer 25 is a coupling 27 of a size to be readily threaded into the boss 13. Thus, should the jar 9 be broken and it be impossible at that time to obtain a new one, the tube 20 may be unthreaded from the boss 13, the strainer 25 may be removed from the tube 23, and by bending the latter in the required manner, to properly position the coupling 27 with respect to the boss 13, said coupling may be threaded into said boss. This relation of parts is shown in Fig. 5 and it will be seen that free passage of liquid from the supply tube 28 to the discharge tube 29, is then permitted. This is of great advantage when the filter is used upon an automobile, in the fuel line of the latter, as the machine will not be "crippled" if the jar is broken, but may continue on its way after coupling the tube 23 to the boss 13, as shown in Fig. 5.

In the present showing, the tube 20 is provided, above the water level, with a plurality of small openings 30. In case of any back suction through the tube 28, coupling 19, boss 13 and upper portion of the tube 20, these openings permit fuel or other filtered liquid from the upper portion of the jar 9, to enter the tube, thus relieving the suction and preventing it from drawing any of the accumulated sediment from the lower portion of the jar, back to the supply tank. These openings also have a further function, in that they will admit fuel or the like from the upper portion of the tube 20 into the upper part of the jar 9, to find its way through the strainer 25 and into the outlet tube 23, even should the water W be frozen solidly. The openings 30 preferably decline toward the center of the tube 20 as I have found that under ordinary favorable conditions, this inclination tends to prevent direct discharge of liquid from the tube 20 into the upper portion of the jar 9, the liquid then passing on through the tube 20 and the strainer 21 into the water W, through which it rises to the upper portion of the jar, so that it is effectively filtered. Further filtering and straining is of course effected by the strainer 25.

Figs. 7 and 8 disclose that the device may be used in an inverted position or in a horizontal position. In either case, the strainer 25 is above the water level and the strainer 21 is below said level. Moreover, the opening 30 will of course be above the water level and it will be understood that the tubes may necessarily be bent in one manner or another to properly position them.

For drawing out any accumulated matter from the jar, without the necessity of entirely detaching the latter, a siphon may be employed, having one leg 31 within the jar 9 and its other leg 32 at the exterior thereof, said leg 32 being provided with an appropriate cock 33 which is normally closed.

I claim:

1. In a filter having a fragile container; a liquid inlet passage, a liquid outlet passage, one of said passages including a tube in the container, and means normally in said container for coupling said tube of the one passage to the other passage in case of injury to the container.

2. In a filter having a fragile container; a liquid inlet passage, a liquid outlet passage including a tube in the container, a removable hollow strainer on the end of said tube, and a coupling normally confined in said strainer and adapted, when the latter is removed, for connection with said liquid inlet passage, whereby liquid may be conducted from one passage to the other in case of injury to the container.

3. A structure as specified in claim 1; said tube being of readily bendable nature to permit easy movement thereof into proper relation with said other passage when it is to be coupled thereto.

4. A filter comprising a container whose lower portion contains a filtering liquid, a liquid inlet passage including a tube in the container extending to a point below the level of the filtering liquid, and a filtered liquid outlet passage leading from the container above the level of the filtering liquid, said tube having an opening into the container above the level of the filtering liquid, for the purposes set forth.

5. A structure as specified in claim 4; said opening declining toward the center of the tube for the purpose set forth.

In testimony whereof I have hereunto affixed my signature.

FREDERICK O. CATRON.